3,766,225
NOVEL PROCESS FOR PREPARING STEROID
HALOHYDRINS AND VINYL HALIDES
Howard E. Harris, Bloomfield, and Carl J. Miskowicz, Garwood, N.J., assignors to Schering Corporation, Bloomfield, N.J.
No Drawing. Filed Nov. 15, 1972, Ser. No. 306,781
Int. Cl. C07c *169/30*
U.S. Cl. 260—397.4        8 Claims

ABSTRACT OF THE DISCLOSURE

Steroidal epoxides react with certain carbinoliminium halide salts in a medium containing at least one equivalent of such salt to form halohydrins which may be further reacted to form vinyl halides. Optionally, the epoxides may be reacted in the same medium with at least two equivalents of the salt to form vinyl halides directly. Reaction conditions for such transformations are described.

---

This invention relates to a novel process for converting steroidal epoxides to halohydrins and thence to the corresponding vinyl halides.

More particularly, this invention relates to a process for opening steroidal oxiranes thereby forming a halohydrin and, optionally, converting the halohydrin to the corresponding vinyl halide.

Prior art

Typical methods used in the art for preparing halohydrins via the opening of steroidal oxirane rings are effected by treating the oxirane with aqueous hydrohalic acid, or, alternatively, with gaseous hydrogen halide dissolved in a non-reactive organic solvent. The acid solutions are usually admixed with a solution of the steroidal epoxide (oxirane) and the reaction permitted to proceed until the halohydrin is formed. These prior art procedures present a hazardous handling problem in the laboratory and in plant operations. The preparation of the acid solution is a highly exothermic process which requires vigorous agitation and external cooling to prevent a "boil-over" due to localized over heating. Secondly, by virtue of the need for dissipating the heat generated, the preparation of the solutions is time consuming. Thirdly, and more importantly, side reactions due to the presence of strong acids are very common in such halohydrin formations. The side reactions not only lower the yield of the desired product making its preparation more costly but they also introduce the problem of separating the desired product from the unwanted by-products which are concurrently produced.

The conversion of halohydrins to vinyl halides by methods known heretofore usually requires treating a halohydrin with a dehydrating agent to yield the desired vinyl halide. This reaction also gives rise to unwanted products due to the dehydrating agent's lack of selectivity in that other hydroxyl groups on the steroid molecule may also be dehydrated. This is especially true for hydroxyl groups which are situated so as to yield an alpha-beta unsaturated moiety upon dehydration.

We have discovered a process which obviates the disadvantages associated with the processes used heretofore. By the process of our invention, the reaction conditions and ratios of the reactants may be arranged so as to yield either the halohydrin or the vinyl halide in good yield under mild conditions.

By the process of our invention, steroidal epoxides may be converted to halohydrins by reacting the epoxide with at least one equivalent of a "carbinoliminium halide salt" wherein the halogen has an atomic weight greater than 19, in a suitable organic solvent for from about ½ to about 24 hours at a temperature in the range of from about $-10°$ to about $30°$ C. preferably about $20°$ C.

By the process of this invention, a steroidal epoxide may be converted to a halohydrin and thence without isolation to the corresponding vinyl halide by the reaction of said epoxide with a "carbinoliminium salt" wherein the halogen has an atomic weight greater than 19 in a suitable organic solvent for from about 4 to about 100 hours at a temperature in the range of from about $30°$ to about $100°$ C., preferably about $50°$ C.

In general, the solvents used to effect these same reactions by the prior art processes may also be used in the process of this invention. Exemplary of such solvents are chloroform, dimethylacetamide, dimethylformamide, dioxane, tetrahydrofuran, acetonitrile, dimethyl sulfoxide, sulfolane, acetic acid, hexamethylphosphoric triamide, diethylene glycol dimethyl ether (diglyme), 1,2-dimethoxyethane and the like.

"Carbinoliminium halide salts" are articles of commerce; dimethylacetamide hydrochloride is sold by Southwestern Analytical Chemicals, Austin, Tex. Other such compounds may be obtained from other vendors or may be prepared by methods known in the art, such as the reaction of an amide, preferably a tertiary amide with a hydrogen halide having a molecular weight greater than 20, in a solvent selected from the group described above and separating the carbinoliminium salts, thus formed, by centrifugation or filtration. Exemplary of such a method is the following:

Preparation 1

Dissolve 10 g. of n-methylpyrrolidone in 100 ml. of dry ethyl ether and cool the solution to $0°$ C. Pass into the solution anhydrous hydrogen chloride until precipitation of the white salt ceases. Filter the suspension, wash the precipitate with dry ethyl ether and dry in vacuo at room temperature ($25°$ C.).

By following the preparation described above, the corresponding hydrogen bromide or hydrogen iodide salts may be prepared, the procedure being of general utility for preparing carbinoliminium halide salts of hydrogen halides having a molecular weight greater than 20.

These salts may be depicted as shown below:

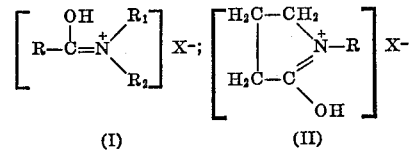

(I)           (II)

wherein R, $R_1$ and $R_2$ are members of the group consisting of hydrogen and lower alkyl and X is a member selected from the group consisting of chloro, bromo and iodo.

The process of this invention is generally described by the following reaction sequences:

REACTION SEQUENCE I

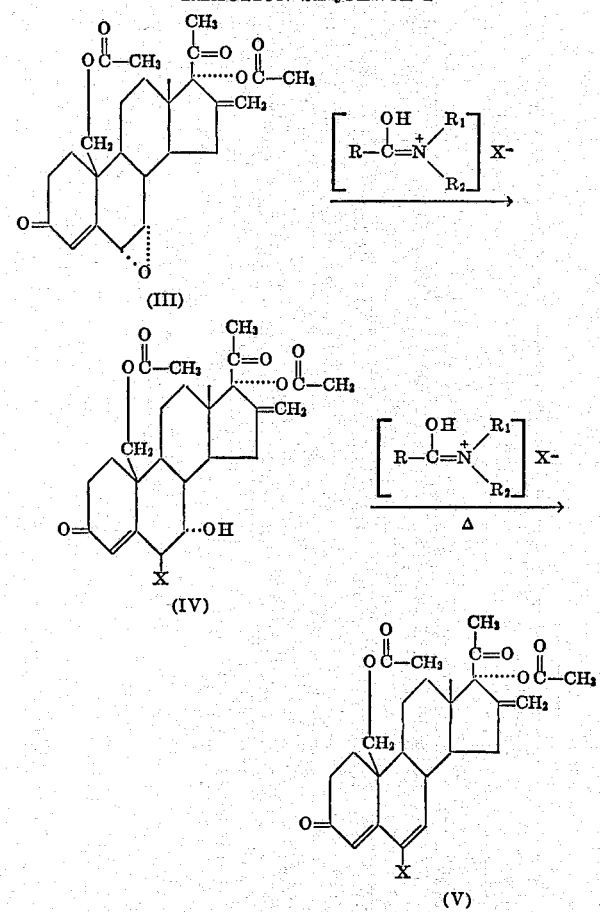

REACTION SEQUENCE II

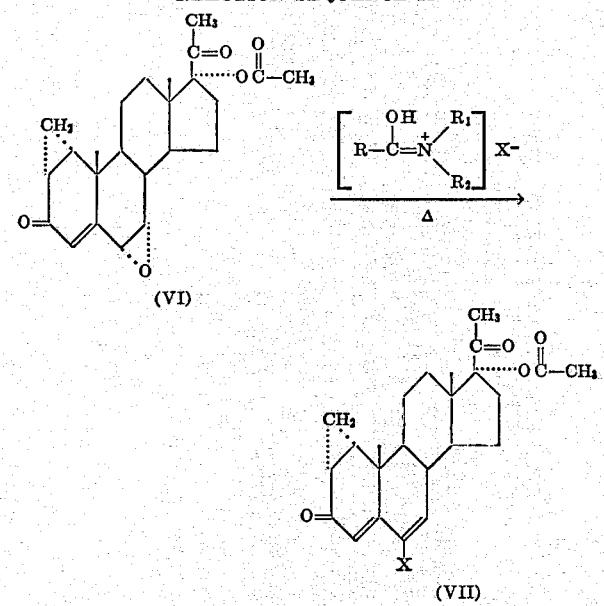

wherein R, $R_1$, $R_2$ and X are as previously defined.

The starting compounds (steroidal epoxides) are well known in the art and may be prepared by a variety of methods including those described in Steroid Reactions (1963) Holden-Day Inc.

The products of this invention exhibit a variety of pharmacological effects. Some exhibit a progestational effect while others exhibit an antiandrogenic effect, still others exhibit an androgenic and/or an anabolic effect. Thus, they are useful in the treatment of male or female hormone dysfunction. Some of the products of this invention may be converted to corticosteroids by means known in the art and are, therefore, useful as intermediates for the preparation of compounds exhibiting corticoid activity, e.g. anti-inflammatory activity. The regimen to be employed when utilizing the products of this invention depend upon the specific condition being treated and the severity of such condition. Other products of this invention may be converted to aldosterone antagonists, and are therefore, useful as intermediates for the preparation of steroidal agents with diuretic activity for the treatment of hypertension, cirrhosis, etc. The utilization of steroids for each of the above-mentioned conditions is well known in the art.

The following examples are set forth to illustrate the inventive process but not to limit the same.

EXAMPLE 1

6β-chloro-1α,2α-cyclomethylene-7β,17α-dihydroxy-4-pregnene-3,20-dione 17-acetate

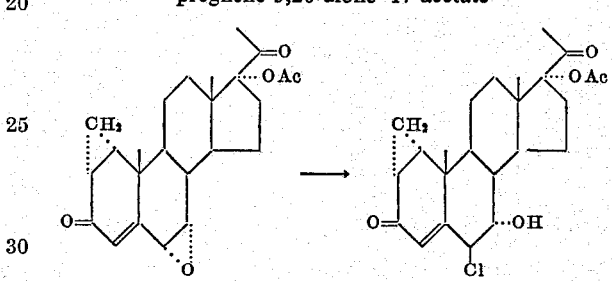

To a solution of 57.0 g. of 6α,7α-oxido-1α,2α-cyclomethylene-17α-hydroxy-4-pregnene-3,20-dione 17-acetate in 300 ml. of dry chloroform at 0° C. add 23.0 g. of dimethylacetamide hydrogen chloride dissolved in 130 ml. of dry chloroform at 0° C. Stir the reaction mixture for two hours at 0–5° C. and pour it into 900 ml. of water. Extract the aqueous mixture with chloroform, wash the organic layer with water, dry over magnesium sulfate and concentrate until a solid crystal slurry is obtained. Cool the slurry and separate the precipitate by filtration to obtain 6β-chloro-1α,2α-cyclomethylene-7β,17α-dihydroxy-4-pregnene-3,20-dione 17-acetate, yield 57.7 g.; $[\alpha]_D^{25}$ +102.1° (dioxane); the nuclear magnetic resonance spectra and the infrared spectra agree with the structure set forth.

EXAMPLE 2

6-chloro-1α,2α-cyclomethylene-17α-hydroxy-4,6-pregnadiene-3,20-dione 17-acetate

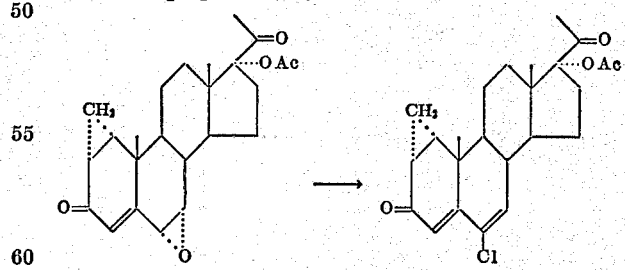

To a solution of 5.0 g. of 6α,7α-oxido-1α,2α-cyclomethylene-17α-hydroxy-4-pregnene-3,20-dione 17-acetate in 37.0 ml. of dimethyl sulfoxide, previously dried over 3A molecular sieve at 55° C., add 7.0 g. of dry dimethylacetamide hydrogen chloride. Stir the reaction soluiton for 100 hours and pour the solution into 100 ml. of water. Extract the precipitate with five 100 ml. portions of chloroform, wash the organic extracts with water, concentrate to dryness and dissolve residue in benzene at room temperature. Pass the solution through chromatographic column containing 50 g. of Florisil (trademarked product of the Floridin Company) and concentrate the eluate to give the product, 6-chloro-1α,2α-cyclomethylene-17α-hydroxy-4,6 - pregnadiene-3,20-dione 17-acetate, yield 4 g., [α] +145.8 (dioxane) infrared spectra, nuclear magnetic resonance spectra agrees with the structure and a thin layer chromatogram compares favorably with a reference standard.

EXAMPLE 3

6β-chloro-16-methylene-7α,17α,19-trihydroxy-4-pregnene-3,20-dione 17,19-diacetate

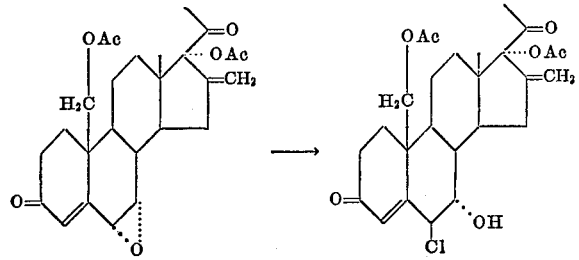

To a solution of 5.2 g. of 16-methylene-6α,7α-oxido-17α, 19-dihydroxy-4-pregnene-3,20-dione 17,19-diacetate in 104 ml. of dry chloroform is added 2.60 g. of dimethylacetamide hydrogen chloride at 25° C. Stir the reaction mixture for 35 min., add 700 ml. of methylene chloride and wash the extract with salt water, then water. Concentrate the organic layer to a residue to yield 6β-chloro-16-methylene - 7α,17α,19-trihydroxy - 4-pregnene - 3,20-dione 17,19-diacetate, 5.67 g. the nuclear magnetic resonance spectra, infrared spectra and mass spectra are in agreement with the proposed structure.

EXAMPLE 4

6-chloro-17α-hydroxy-16-methylene-4,6-pregnadiene-3,20-dione

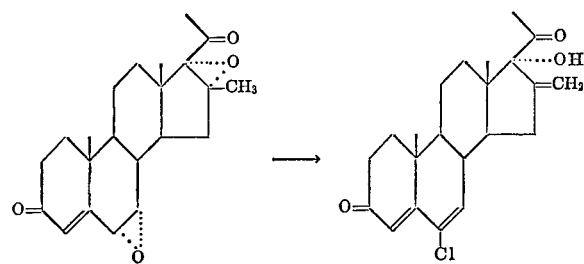

To a solution of 5.0 g. of 16β-methyl-6α,7α; 16α,17α-bis-oxido-4-pregnene-3,20-dione in 42 ml. of dry dimethyl sulfoxide at 55° C. add 7.5 g. of dry dimethylacetamide hydrogen chloride. Stir the reaction mixture for 100 hours and pour it into 100 ml. of water. Extract the aqueous mixture with five 100 ml. portions of methylene chloride, wash the extracts neutral with water and concentrate them to dryness. Dissolve the residue with warm ethyl acetate, concentrate and cool until a crystal slurry is obtained. Filter the product, 6-chloro-17α-hydroxy-16-methylene-4,6-pregnadiene-3,20-dione, yield 4.2 g., [α]$_D$ −38.5, (dioxane) infrared spectrum, nuclear magnetic resonance spectra, mass spectra and thin layer chromatography compare favorably with a reference standard.

EXAMPLE 5

6β-chloro-1α,2α-cyclomethylene-16α,17α-(dimethylmethylenedioxy)-4,6-pregnadiene-3,20-dione

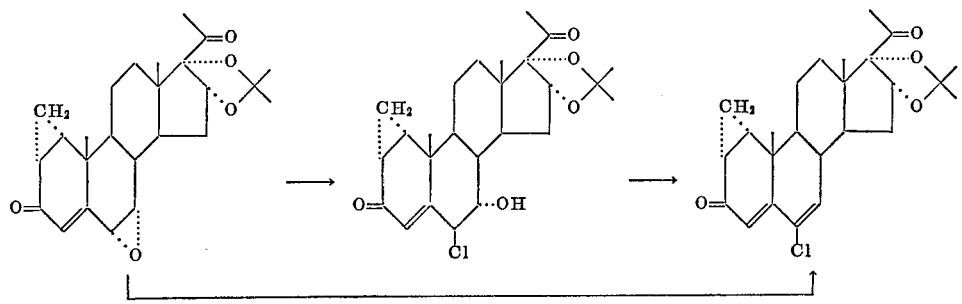

A solution of 250 mg. of 6α,7α-oxido-1α,2α-cyclomethylene-16α,17α - (dimethylmethylenedioxy) - 4 - pregnene-3,20-dione in 10 ml. of dimethyl sulfoxide is reacted with 500 mg. of dimethylacetamide hydrogen chloride at 40° C. for 70 hours. Pour the solution into water and methylene chloride is added. The organic layer is worked neutral with water, dried and concentrated to dryness. The residue is recrystallized from acetone-ethyl ether to yield 6β-chloro-1α,2α-methylene - 16α,17α - (dimethylmethylenedioxy)-4,6-pregnadiene-3,20-dione, $\lambda_{max.}^{MeOH}$ 287 nm.; $\epsilon$=22,500

EXAMPLE 6

6-chloro-6-dehydro-17α-ethynyl-19-nortestosterone

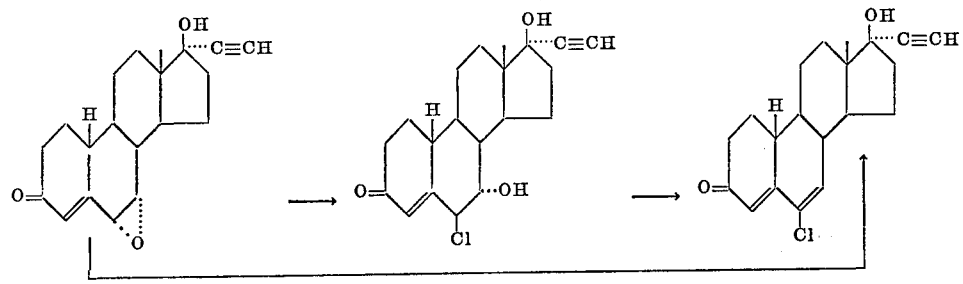

A solution of 200 mg. of 6α,7α-oxido-17α-ethynyl-19-nortestosterone in 10 ml. of dimethyl sulfoxide is treated with 300 mg. of dimethylacetamide hydrogen chloride at 45° C. for 48 hours, add 100 ml. of water and extract mixture with methylene chloride. Wash the organic layer neutral with water, concentrate to a residue and recrystallize the product from acetone-ethyl ether to yield 6-chloro-6-dehydro-17α-ethynyl-19 - nortestosterone, M.P. 155–159° C. (decomposition), [α]$_D$ —83° (dioxane), $\lambda^{MeOH}_{max.}$ 283 nm.; $\epsilon = 22,400$

EXAMPLE 7

6β-chloro-17α-hydroxy-16-methylene-4,6-pregnadiene-3,20-dione

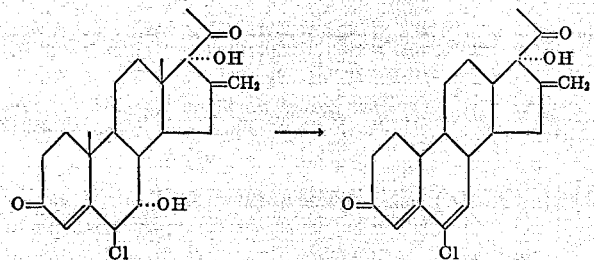

To a solution of 1.0 g. of 6β-chloro-7α,17α-dihydroxy-16-methylene-4-pregnene-3,20-dione in 10 ml. of dimethylacetamide add 1.5 g. of acetamide hydrogen chloride at 50° C. Stir the reaction mixture for 72 hours and pour into water and extract with methylene chloride. Wash the extract neutral with water and dry over magnesium sulfate. Concentrate to dryness to yield essentially pure 6β-chloro-17α-hydroxy-16-methylene - 4,6 - pregnadiene-3,20-dione.

EXAMPLE 8

6β-bromo-1α,2α-cyclomethylene-7β,17α-dihydroxy-4-pregnene-3,20-dione 17-acetate

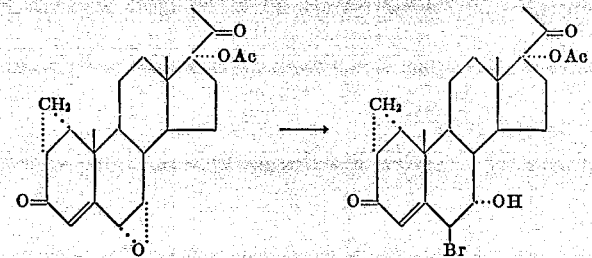

To a solution of 100 mg. of 6α,7α-oxido-1α,2α-cyclomethylene-17α-hydroxy-4-pregnene-3,20-dione 17-acetate in 3.5 ml. of dry chloroform at 0° C. add 50 mg. of dimethylacetamide hydrogen bromide dissolved 0.5 ml. of dry chloroform. Stir the reaction mixture for 2.5 hours and pour into 10 cc. of water and filter. Wash the filtrate with water, dry the product which is recrystallized from acetone-ethyl ether to yield 6β-bromo-1α,2α-cyclomethylene-7β,17α-dihydroxy-4-pregnene-3,20-dione 17-acetate.

EXAMPLE 9

Conversion of 16β-methyl-6α,7α; 16α,17α-bis - oxido - 4-pregnene-3,20-dione to 6β-chloro-7α,17α-dihydroxy-16-methylene-4-pregnene-3,20-dione

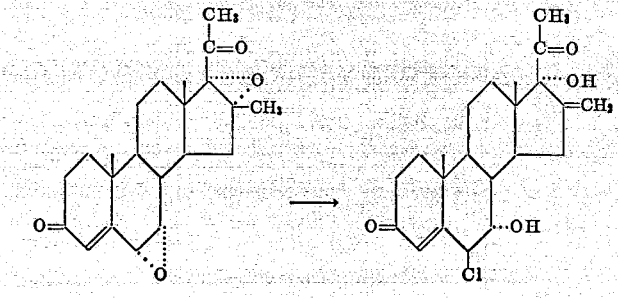

(A) To a solution of 50.0 g. of 16β-methyl-6α,7α; 16α,17α-bis-oxido-4-pregnene-3,20-dione in 125 ml. dry chloroform at room temperature, add rapidly a solution of 29 g. of dimethylacetamide hydrogen chloride in 125 ml. of dry chloroform. Stir the reaction mixture until a precipitate forms, then continue stirring for two hours thereafter. Distill the chloroform in vacuo at steam bath temperature until the reaction mixture has a volume of about 150 ml. Add 50 ml. of ethyl ether to the residue, then redistill in vacuo at steam bath temperature to a residue having a volume of about 150 ml. Filter the resultant residue and wash the precipitate with cold ethyl ether and dry to a constant weight in vacuo to obtain 6β-chloro-7α,17α-dihydroxy-16-methylene-4-pregnene - 3,20 - dione, yield=45 g.; M.P.=265° C. (decomposition); [α]$_D^{25}$ —54° (pyridine)

$\lambda^{methanol}_{max.}$ 240 nm.; $\epsilon = 12,200$.

(B) Alternatively, the compound of this example is prepared as follows: To 100 mg. of 6α,7α; 16α,17α-bis-oxido-16β-methyl-4-pregnene-3,20-dione in 0.5 ml. of chloroform at room temperature, add 100 mg. of N-methyl pyrrolidone hydrogen chloride. Stir the reaction mixture at room temperature for one hour and separate the resultant white crystalline precipitate by filtration, wash the precipitate with chloroform and dry in vacuo to obtain 6β-chloro-7α,17α-dihydroxy-16 - methylene - 4 - pregnene-3,20-dione, yield=65 mg.; M.P.=250° C. (decomposition); [α]$_D^{25}$ —62.7° (1% pyridine)

$\lambda^{methanol}_{max.}$ 240 nm.; $\epsilon = 12,900$.

EXAMPLE 10

Conversion of 6α,7α; 16α,17α-bis-oxido-4-pregnene-3,20-dione to 6β,16β-dichloro-7α,17α-dihydroxy-4-pregnene-3,20-dione

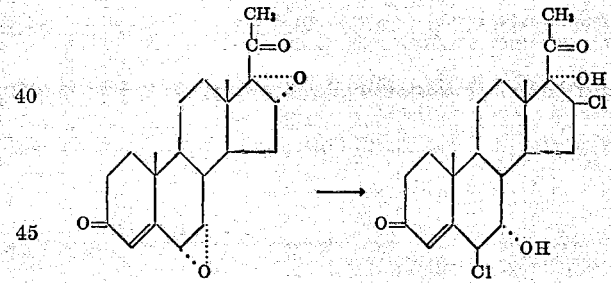

To a solution of 35 mg. of 6α,7α; 16α,17α-bis-oxido-4-pregnene-3,20-dione in 1.5 ml. of chloroform at room temperature, add 100 mg. of dimethyl acetamide hydrogen chloride. Stir the reaction mixture at room temperature for about 18 hours. Pour the reaction mixture into water and extract the aqueous mixture with chloroform. Wash the combined chloroform extracts with water, dry the chloroform over magnesium sulphate and evaporate the chloroform in vacuo at steam bath temperature to a residue comprising 6β,16β-dichloro-7α,17α-dihydroxy-4-pregnene-3,20-dione.

EXAMPLE 11

17α-methyl-4,5-oxidoandrostane-17β-ol-3-one to 4-chloro-17α-methyl-4-androstene-17β-ol

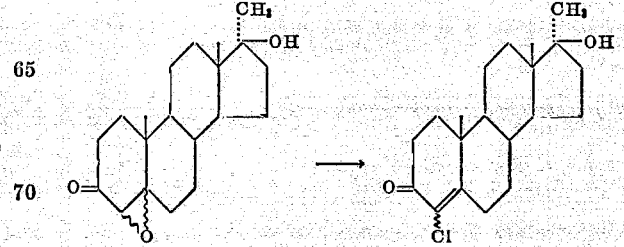

To a solution of 50 mg. of 4,5-oxido-17α-methylandrostane-17β-ol-3-one (comprising predominantly 4β,5β-oxido derivative in a mixture with some 4α,5α-oxido derivative)

in 0.5 ml. of chloroform, add 100 mg. of dimethylacetamide hydrogen chloride at room temperature. Stir the reaction mixture for one hour at room temperature, then add an additional 50 mg. of dimethylacetamide hydrogen chloride. Continue stirring the reaction mixture at room temperature for another hour, then pour the reaction mixture into water. Extract the aqueous mixture with chloroform, then wash the combined chloroform extracts with water. Dry the chloroform solution over magnesium sulphate and distill in vacuo to a residue comprising 4-chloro-17α-methyl-4-androstene-17β-ol-3-one in the form of a crystalline mass, yield=40 mg.; $[\alpha]_D^{25}$ +43.8°

$\lambda_{max.}^{methanol}$ 255 nm.; $\epsilon$=9,000.

EXAMPLE 12

6-chloro-16-methylene-17α,19-dihydroxy-4,6-pregnadiene-3,20-dione 17,19-diacetate

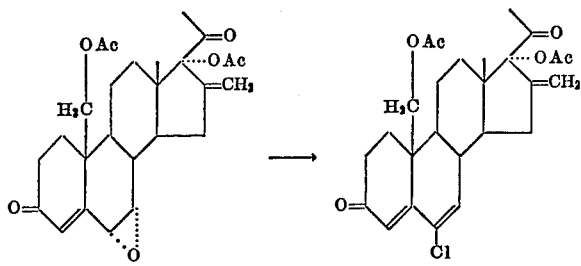

To a solution of 3.14 g. of 16-methylene-6α-7α-oxido-17α,19-dihydroxy-4-pregnene-3,20-dione 17,21-diacetate in 10 ml. of dimethyl sulfoxide add 3.0 g. of dimethylacetamide hydrogen chloride at 50° C. Stir the reaction mixture for 72 hours and pour it into 150 ml. of water and extract with methylene chloride. Wash the organic extract with water until neutral, dry over magnesium sulfate.

Concentrate the extracts to dryness and chromatogram over Florisil to yield 6-chloro-16-methylene-17α,19-dihydroxy-4,6-pregnadiene-3,20-dione 17,19-diacetate, 1.75 g. M.P. 221–223°, [α] —100°, $\lambda_{max.}^{MeOH}$ 285 nm.; $\epsilon$=21,000, nuclear magnetic resonance spectra and mass spectra are in agreement with desired structure.

We claim:

1. A process for preparing steroidal vinyl halides which comprises (a) reacting a steroidal epoxide with at least one equivalent of a carbinoliminium halide salt wherein the halogen has an atomic weight greater than 19 in a suitable organic solvent thereby forming the corresponding halohydrin, (b) dehydrating said halohydrin by adding at least one equivalent of carbinoliminium halide salt to the reaction medium, continuing the reaction until dehydration of the halohydrin to the vinyl halide is substantially complete and isolating the thereby formed vinyl halide from said medium.

2. A process according to claim 1 for preparing a steroidal halohydrin wherein the reaction is effected at a temperature of from about —10° C. to about 30° C.

3. The process of claim 2 wherein the reaction is effected at about 25° C. for from about ½ to about 24 hours.

4. A process of claim 1 which comprises reacting the steroidal epoxide with at least 1 mole of the carbinoliminium halide at a temperature of from about —10° to about 30° C. for from about ½ to about 24 hours, and dehydrating the thus formed steroidal halohydrin by adding at least one equivalent of carbinoliminium halide salt to the reaction medium and continuing the reaction at a temperature of from about 30° C. to about 100° C. for from about 4 to about 100 hours thereby forming the corresponding vinyl halide.

5. The process of claim 4 wherein the dehydrating step is effected at about 50° C. for about 18 hours.

6. A process for preparing steroidal vinyl halides which comprises reacting a steroidal epoxide with at least two equivalents of carbinoliminium halide salt wherein the halogen has an atomic weight greater than 19 in a suitable organic solvent at a temperature of from about 30° C. to about 100° C., preferably from about 40° C. to about 60° C. for from about 4 to about 100 hours, thereby forming the corresponding vinyl halide.

7. The process according to claim 6 wherein the steroidal epoxide reacted is 6α,7α-oxido - 1α,2α - cyclomethylene-17α-hydroxy-4-pregnene-3,20-dione 17-acetate, the carbinoliminium halide is dimethylacetamide hydrogen chloride and the vinyl halide so produced is 6-chloro-1α,2α-cyclomethylene-17α - hydroxy - 4,6 - pregnadiene-3,20-dione 17-acetate.

8. The process according to claim 6 wherein the steroidal epoxide reacted is 16β-methyl-6α,7α; 16α,17α-bis-oxido-4-pregnene-3,20-dione, the carbinoliminium halide is dimethylacetamide hydrogen chloride and the vinyl halide so produced is 6-chloro-17α-hydroxy-16-methylene-4,6-pregnadiene-3,20-dione.

References Cited
UNITED STATES PATENTS

| | | | |
|---|---|---|---|
| 3,231,569 | 1/1966 | Krakower | 260—239.55 X |
| 3,344,157 | 9/1967 | Velasco et al. | 260—397.45 X |
| 3,652,604 | 3/1972 | Wiechert | 260—397.4 X |

HENRY A. FRENCH, Primary Examiner

U.S. Cl. X.R.

260—239.55 D